United States Patent [19]

Sasnett

[11] 3,747,004
[45] July 17, 1973

[54] INJECTION-LOCKED LASER STABILIZER

[75] Inventor: Michael W. Sasnett, Los Altos, Calif.

[73] Assignee: The United States of America as represented by the Secretary of the Air Force, Washington, D.C.

[22] Filed: May 14, 1971

[21] Appl. No.: 143,368

[52] U.S. Cl................. 330/4.3, 331/56, 331/94.5, 332/7.51
[51] Int. Cl.............................................. H01s 3/02
[58] Field of Search..................... 332/7.51; 330/4.3; 331/94.5 S, 56

[56] References Cited
UNITED STATES PATENTS 3,471,803  10/1969  Forster ........................... 331/94.5 S
3,633,123  1/1972  Marcatili............................. 331/56
3,534,288  10/1970  Forster.............................. 332/7.51

Primary Examiner—Benjamin A. Borchelt
Assistant Examiner—N. Moskowitz
Attorney—Harry A. Herbert, Jr. and George Fine

[57] ABSTRACT

An injection-locked laser stabilizer is provided utilizing an injection-locked laser system comprising a small stable laser, an optical frequency isolator (circulator) and a high power laser which is injection-locked by the small stable laser. The stabilizer provides an automatic acquisition of the injection-locked condition and maintains that condition for an indefinite period.

3 Claims, 3 Drawing Figures

FIG. 2
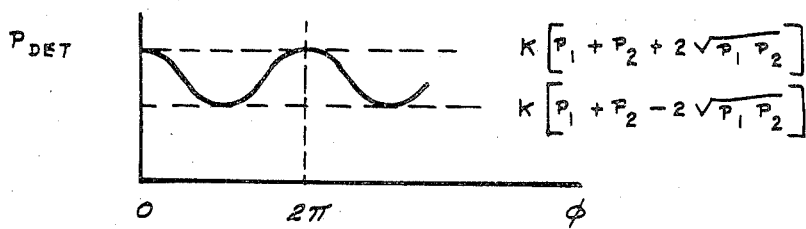
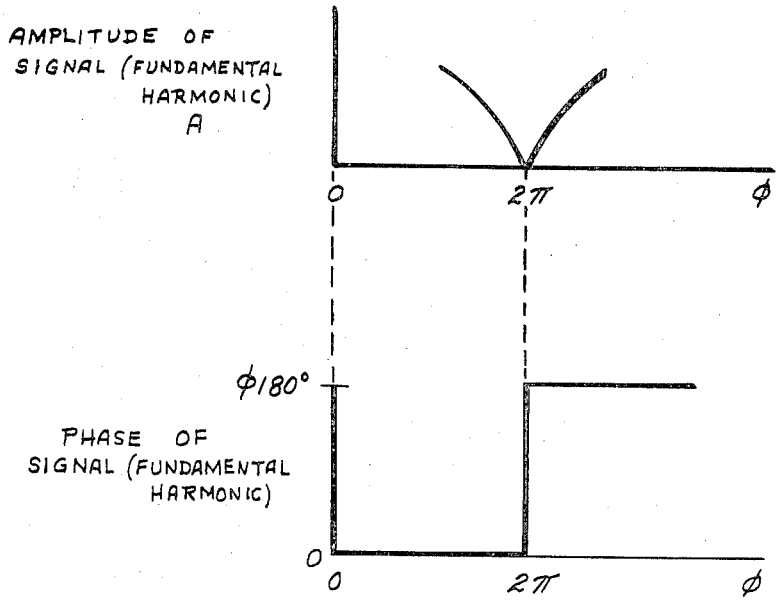
FIG. 3

INJECTION-LOCKED LASER STABILIZER

BACKGROUND OF THE INVENTION

This invention relates to injection-locked lasers and more particularly an injection-locked laser system including a stabilizer to maintain the laser in the injection-locked condition.

A technique referred to as laser injection-locking has previously been demonstrated by H.L.Stover and W.M.Steier in the article entitled "Locking of Laser Oscillators by Light Injection" published in Appl. Phys. Lett. 8, pp 91–93, Feb. 15, 1966 and described by C.L. Tang and H.Statz, in "Phase-Locking of Laser Oscillators by Injected Signal," Journal Appl. Phys. 38, pp 323–324, Jan. 1967 whereby the frequency of a high power laser oscillator may be locked to the signal frequency of a low power, and more stable, laser oscillator. The injection-locking technique has previously found wide application in the radio frequency range. The present invention allows a laser oscillator to remain injection-locked over an indefinite time period, and allows automatic acquisition of the injection-locked condition.

Previously, no method has been available for accomplishing either of these. For lasers, the injection-locked condition can only be maintained for very brief periods on the order of from 1 to 5 seconds, unless techniques such as the one herein described are used.

SUMMARY OF THE INVENTION

An injection-locked laser stabilizer of the present invention is comprised of an injection-locked laser system and a stabilizer in combination therewith. The injection-locked laser system is comprised of a small stable laser emitting a first beam, an optical frequency isolator (circulator) directing the first beam to a high power laser which is ultimately injection-locked. The high power laser provides an output beam, by way of the aforesaid isolator and also the reflected first beam. The stabilization occurs since the high power oscillator also includes as part thereof a cavity tuner. Then the resonant frequency of the high power laser cavity is modulated by applying a sinusoidal signal to the cavity tuner. A detector receives the output and reflected beam. A signal due to power variation at the detector appears. The amplitude, A, and phase, $\phi$, of this signal varies. This error signal is used to electronically measure the magnitude and direction of offset between the high power cavity resonance frequency and the stable laser frequency. This then permits the utilization of an electronic feedback control loop which uses the error signal to maintain the high power laser in the injection-locked mode of operation. An additional optical path is provided in which part of the output of the stable laser is split off and directed through a frequency shifter. The frequency shifter is driven by an R.F. oscillator. The frequency shifted beam is combined with the unshifted beams at the detector producing a heterodyne bent signal at the detector which is utilized in a feedback path to the high power laser to automatically set its frequency at the frequency of the injected signal. This then allows automatic acquisition of the injection-locked condition. There is thus two important advantages that are provided by the invention. One, the injection-locked condition is automatically acquired. Two, the injection-locked condition is automatically maintained. This allows much higher output to be realized from an injection-locked oscillator system, and the requirements on the inherent frequency stability of the high power oscillator are much reduced.

DESCRIPTION OF DRAWINGS

FIG. 2 illustrates the power curve at the photo-detector of FIG. 1; and

FIG. 3 illustrates curves of amplitude and phase at the photo-detector of FIG. 1 due to audio oscillator 25.

DESCRIPTION OF PREFERRED EMBODIMENT

Figure 1:
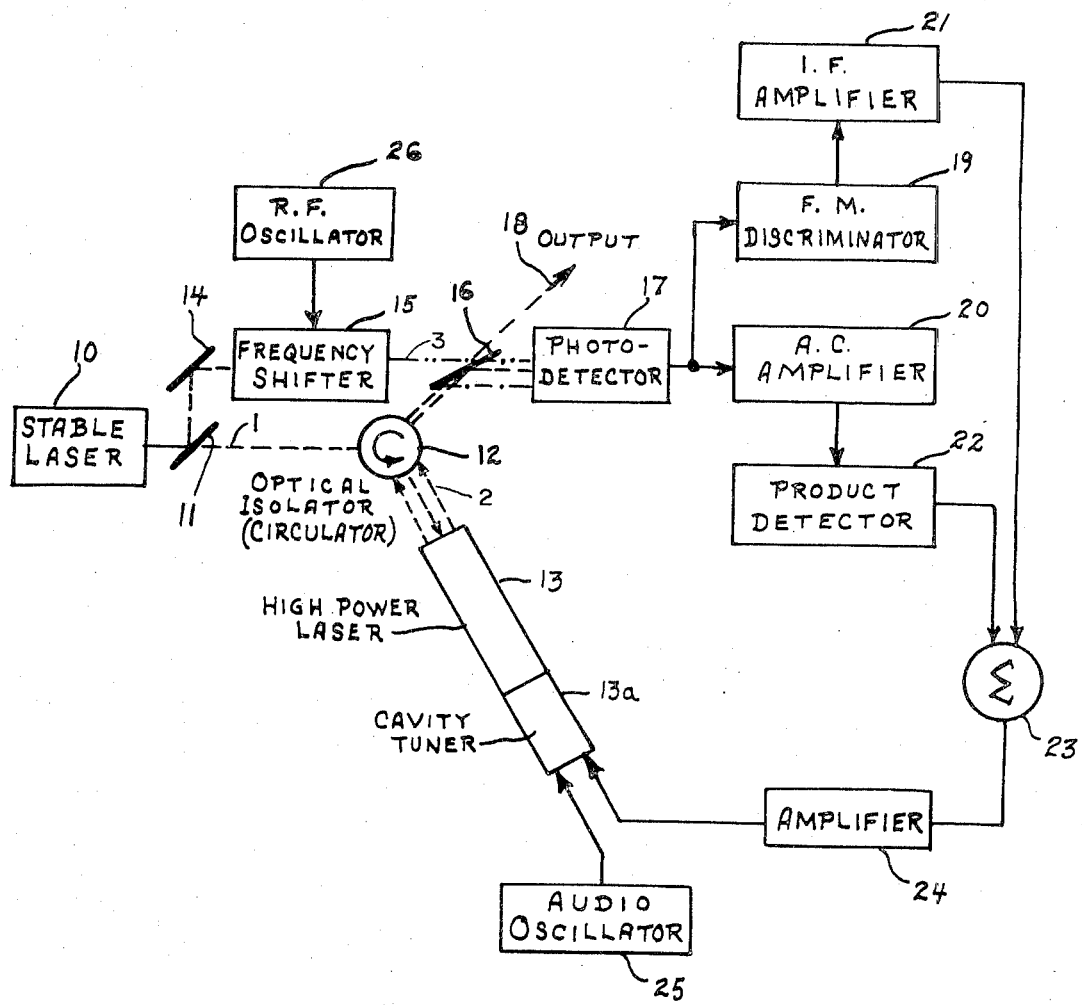
FIG. 1 of the invention illustrates in block diagram form an injection-locked laser stabilizer.

Now referring in detail to the FIG. 1 of the present invention, there is shown conventional low power stable laser 10 emitting beam 1. The symbol for beam 1 is $A_1 \sin \omega_1 t$. Beam 1 is directed by way of conventional optical beam splitter 11 to conventional optical isolator (circulator) 12. Isolator 12 directs beam 1 to conventional high power tunable laser 13. Tunable laser 13 includes a conventional cavity tuner 13a. High power tunable laser 13 provides output beam 2 and also reflected beam 1 to isolator 12 which directs them to mirror 16. The symbol for beam 2 is $A_2 \sin \omega_1 t + \phi$.

Beam 1 is also directed by way of beam splitter 11 to conventional mirror 14 which then reflects it to conventional frequency shifter 15. Frequency shifter 15 is driven by R.F. oscillator 26. Frequency shifter 15 then provides an an output beam 3 which is also directed to mirror 16. Beam 3 has the symbol $A_3 \sin (\omega_1 + \omega_s)t$. Mirror 16 then directs reflected beam 1, output beam 2, and beam 3 to photodetector 17. An output beam for the injection-locked stabilizer is also provided at 18 also by way of mirror 16. The output from photo-detector 17 is simultaneously fed through F.M. discriminator 19 and A.C. amplifier 20. The output signal from F.M. discriminator 19 is passed through I.F. amplifier 21 to summation network 23 and the output from A.C. amplifier 20 is fed through product detector 22. Also to summation network 23. Amplifier 24 interconnects summation network 23 and cavity tuner 13a. Cavity tuner 13a also receives a signal from audio oscillator 25.

Now referring to the operation of the injection-locked laser stabilizer shown in the FIG. 1, the optical power level at detector 17 depends on the power (P) and the relative phase angle ($\phi$) of beams 1 and 2 according to the relations $$P_{det} = k [2 \sqrt{P_1 P_2} \cos \phi + P_1 + P_2]$$

Since the path length traveled by both beams (the reflected beam and the output beam) leaving the output of high power laser 13 is the same, the only phase difference which can arise will be due to fluctuations in the resonant frequency of high power laser cavity 13a while it is being injection-locked. This phase difference is given by $$\phi = \sin^{-1} [\omega_1 - \omega_0 / \Delta \omega_{lock}]$$

where $\omega_1$ is the frequency of the injected signal (beam 1) and $\omega_0$ is the resonant frequency of high power laser cavity 13a. The power measured by detector 17 is therefore at a maximum when $\omega_1 = \omega_0$ and $\phi = 0$. If the high power laser resonant frequency drifts to one side or the other of the input signal frequency, a power reduction at detector 17 will result. $P_{det}$ will have the form shown in FIG. 2.

When the resonant frequency of high power laser cavity 13a is modulated by applying a sinusoidal signal from audio oscillator 25 to cavity tuner 13a, a signal due to power variation at detector 17 will appear. The amplitude, A, and phase, $\phi$, (with respect to the audio oscillator) of this signal will vary as shown in FIG. 3. Only the fundamental harmonic of the signal is of interest.

This signal may then be used to electronically measure the magnitude and direction of offset between the high power cavity resonance frequency and the stable laser frequency. This then allows the use of an electronic feedback control loop which uses this error signal to maintain the high power laser in the injection-locked mode of operation even though its cavity resonance frequency may be inherently unstable. This technique makes use of an A.C. rather than a D.C. error signal and thus avoids the problems involved with the stability of D.C. signals.

By adding an additional optical path in which part of the output of stable laser 10 is split off and beam 3 is thus directed through frequency shifter 15 the capability for automatic acquisition of the injection locked condition is realized. The frequency shifted beam is combined with the unshifted beams from high power laser 13 producing a heterodyne beat signal at detector 17. When this beat signal is just equal to the frequency of R.F. oscillator 16 that drives frequency shifter 15, then stable laser 10 and high power laser 13 will be operating at the same frequency. Therefore, by choosing discriminator 19 to have a center frequency equal to the R.F. oscillator frequency an error signal is developed which when amplified and fed back to high power laser 13 automatically sets its frequency at the frequency of the injected signal. This then allows automatic acquisition of the injection locked condition. The automatic phase control circuit then takes over to maintain the injection-locked condition. Note that with the automatic frequency control provision, reacquisition of the injection-locked condition is assured in the event that some fast transient condition causes the high power laser to become unlocked.

The advantages are the injection-locked condition is automatically acquired and the injection-locked condition is automatically maintained. This allows much higher power output to be realized from an injection-locked oscillator system, and the requirements on the inherent frequency stability of the high power oscillator are much reduced.

The ratio between the input power and output power levels ($P_1$ and $P_2$) in an injection-locked system is subject to the requirement that if the resonant frequency of the high power laser cavity drifts back and forth within a range $2\Delta\omega$ then, $$2\Delta\omega \leq \omega_0/Q \, [P_1/P_2]^{1/2}$$

where $\omega_0 =$ oscillation frequency and $Q =$ cavity quality factor for high power laser. The gain available in an injection locked system is then given by $$G = P_2/P_1 = (\omega_0/2\Delta\omega \, Q)^2$$

Since the injection-locked laser system very effectively reduces $\Delta\omega$, the gain available from an injection locked system is much larger than would otherwise be possible.

I claim:

1. An injection-locked laser stabilizer comprising a low power stable laser providing a first beam at a predetermined frequency, a high power laser providing a second beam at a preselected frequency, said high power laser having output means for said second beam and also including a cavity tuner integrated with said high power laser, audio oscillator means providing a preselected frequency signal to modulate said cavity tuner, first means to pass said first beam in a first direction and a portion thereof in a second direction, second means receiving said passed first beam for direction into said output means of said high power laser for injection-locking purposes, said high power laser-reflecting said first beam from said output means and also providing therefrom said second beam to said second means, photo-detector means, third means receiving said reflected first beam and said second beam from said second means for direction to said photo-detector means, frequency shifting means, R.F. oscillator means operating at a preselected frequency for driving said frequency shifting means, fourth means directing said portion of said first beam to said frequency shifting means for a preselected frequency shift thus providing a third beam, said third beam also being directed to said photo-detector means by way of said third means, F.M. discriminator means, said F.M. discriminator having a center frequency equal to the R.F. oscillator frequency, A.C. amplifier means, said F.M. discriminator means and said A.C. amplifier means receiving simultaneously the output signal from said photo-detector means, a product detector receiving a signal from said A.C. amplfier means, a summation network receiving signals from said F.M. discriminator means and said product detector to provide a resultant signal for reception by said cavity tuner to provide an automatically acquired injection-locked condition and to automatically maintain the injection-locked condition in said high power laser.

2. An injection-locked laser stabilizer as described in claim 1 further including an I.F. amplifier interconnecting said F.M. discriminator means and said summation network.

3. An injection-locked laser stabilizer as described in claim 1 further including an amplifier interconnecting said summation network and said cavity tuner.

* * * * *